Patented Mar. 13, 1934

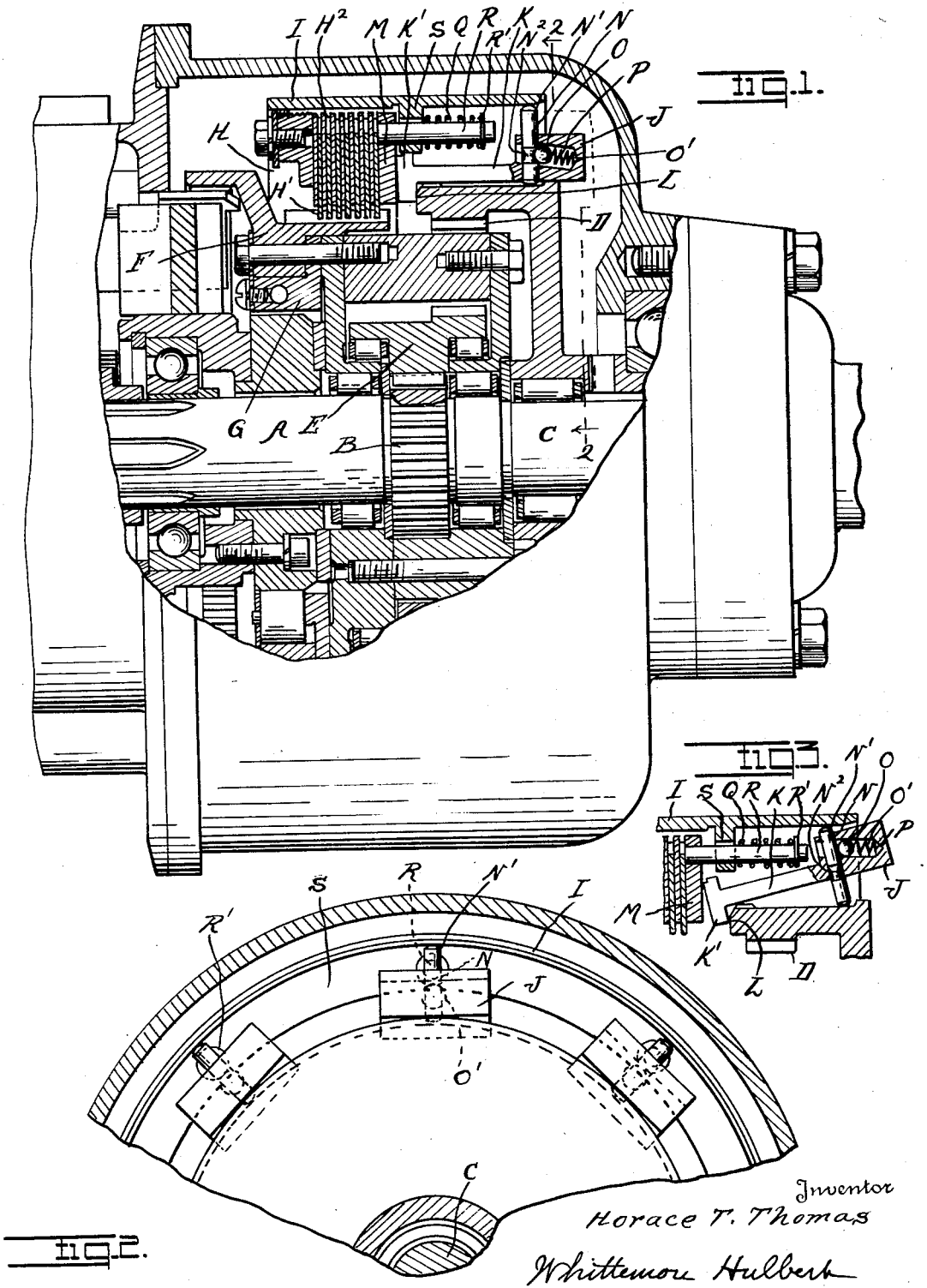

1,950,581

UNITED STATES PATENT OFFICE 1,950,581

VARIABLE SPEED TRANSMISSION MECHANISM

Horace T. Thomas, Lansing, Mich., assignor to Reo Motor Car Company, a corporation of Michigan Application January 30, 1933, Serial No. 654,340

4 Claims. (Cl. 74—34)

The invention relates to variable speed transmission mechanisms and has more particular reference to that type comprising a planetary gearing and a centrifugally operated friction clutch. With such structures the friction clutch is employed to couple two members of said gearing normally running at differential speed, thereby gradually changing the ratio until the whole structure revolves at high speed.

In construction heretofore used the centrifugally operated members have been carried by the driven member of the gearing and as the speed of the latter is increased the centrifugal force will react to apply pressure to the clutch to effect the gradual coupling action. However, one difficulty that has been encountered is that for even low speeds there will be some centrifugal action which will apply the clutch sufficiently to place a drag on the clutch plates without performing any useful function. If this action is counteracted by the use of springs it will require so much additional centrifugal force to overcome the spring tension and this resistance continues throughout the entire operation.

It is the object of the present invention to provide means for preventing operation under centrifugal action until the driven member has acquired a predetermined angular speed and to then free the centrifugal members so that they may exert the full centrifugally developed force for operation of the friction clutch. To this end the invention consists in the construction as hereinafter set forth.

In the drawing:

Fig. 1 is a longitudinal section through a portion of a variable speed transmission gearing to which my improvement is applied;

Fig. 2 is a sectional end elevation thereof;

Fig. 3 is similar to a portion of Fig. 1 showing the parts in a different position of adjustment;

In the specific construction illustrated, the variable speed transmission employed in connection with my improvement comprises a drive shaft A having a sun gear B thereon, a driven shaft C provided with an internal gear D surrounding said sun gear, an internal external ring gear E forming an intermediate planetary gear between the sun gear B and the internal gear D and a gear carrier F on which the gear E is rotatively mounted. The gear carrier F is held from reverse rotation by an overrunning or one way clutch G and therefore normally holds the ring gear E against planetary movement while permitting it to revolve around its own axis in transmitting rotation of the sun gear B to the internal gear D. This will drive the shaft C at a lower speed than the drive shaft A, determined by the ratio of the gears B and D to each other. If, however, the gear carrier F is caused to rotate in the same direction as the sun gear B, it will impart a planetary movement to the gear E which will accelerate the movement of the internal gear D.

To communicate such rotary motion to the carrier F a friction clutch H is employed, this comprising a series of annular clutch plates H' keyed to the carrier F and an intermediate series of clutch plates H² keyed to a drum I which is coupled to the gear wheel D to rotate therewith. Pressure for applying friction to these clutch plates is developed by a series of weights J which are at the end of levers K having T-shaped heads K'. The inner end of the heads K' has a fulcrum bearing at L on the member D so that whenever the weight J is moved radially outward through centrifugal action the T-head K will be tilted to bring pressure against the follower plate M which clamps the friction plates H', H² to each other. Thus the friction will be gradually increased as the angular speed of the member D is increased, thereby accelerating the member F until finally all members rotate at the same speed as the drive shaft A.

The construction as thus far described has the defect previously referred to that even where the member D is rotating at low speed, centrifugal action will cause the outward movement of the weights J and apply pressure to the friction disks H', H². This while insufficient to greatly accelerate the carrier F will result in drag on the member B and wear of the friction plates. Such defects I have overcome by the provision of a catch which holds the weight J from outward movement under initial centrifugal pressure, but which will be disengaged by increased pressure to free said weight, the construction being as follows:

Each of the weights J has formed therethrough a radially extending bore N for receiving a pin N' having its opposite ends bearing respectively against the member D and the outer drum member I. The pin N' has an annular groove N² formed therein and a ball O is placed in a transversely extending recess O' in the member J together with a spring P for resiliently forcing said ball into the groove N². With this construction whenever the member D is rotating at less than a predetermined angular speed, the catch formed by the ball O engaging the groove N² will couple the weight J to the pin N' and as the latter is bearing against the drum I the weight will be temporarily held from outward radial movement. When, however, centrifugal force increases to a predetermined point the ball O will be forced out of the groove N² to free the weight J which thereupon will move radially outward, tilting the lever K and T-head K' and applying clamping pressure upon the follower plate M. This pressure will develop sufficient friction between the plates H', H² to drive the follower F forward gradually accelerating its speed as centrifugal action increases until all of the parts revolve at the same angular speed as the shaft A.

To retract the follower plate K when the angular speed of the member D decreases, springs Q are sleeved upon pins R, which pins are attached to the follower plate M and pass through apertures in an abutment flange S. One end of said spring engages this abutment flange while a collar R' on the pin R forms a bearing for the opposite end of said spring. Thus as the angular speed of the driven member decreases the reaction of the springs Q against the follower plate M and T-head K' of the levers K will force the weights J radially inward until the ball O engages the groove N².

What I claim as my invention is:

1. A variable speed planetary transmission mechanism comprising a sun gear, an internal gear surrounding the same, an intermediate planetary gear, a planetary gear carrier, an overrunning or one-way clutch for preventing reverse rotation of said planetary gear carrier, of a drum connected with said internal gear wheel surrounding said planetary gear carrier, a multiple disk friction clutch between said drum and planetary gear carrier, a weighted lever mounted within said drum extending longitudinally thereof and adapted to be centrifugally operated to apply pressure to said clutch, and a yieldable latch engaging the weighted end of said lever and restraining the operation of the same under centrifugal action until said drum attains a predetermined angular speed.

2. In a variable speed transmission mechanism, the combination with a plurality of members, one of which is rotating relative to another, a friction clutch between said members, a weighted lever mounted on said rotating member extending longitudinally thereof and adapted to be centrifugally operated to apply pressure to said clutch and a yieldable catch engaging the weighted end of said lever for restraining movement thereof until said rotating member attains a predetermined angular speed.

3. A variable speed planetary transmission mechanism comprising a sun gear, an internal gear surrounding the same, an intermediate planetary gear, a planetary gear carrier, an overrunning or one-way clutch for preventing reverse rotation of said planetary gear carrier, of a drum connected with said internal gear wheel surrounding said planetary gear carrier, a multiple disk friction clutch between said drum and planetary gear carrier, a weighted lever mounted within said drum and adapted to be centrifugally operated to apply pressure to said clutch, a pin extending through a radial aperture in said weighted lever having its outer end bearing against said drum and being provided with a groove, a ball located in a recess in said weighted lever and a spring for pressing said ball into engagement with the groove in said pin to form a yieldable catch for holding said lever from outward movement under centrifugal action until a predetermined angular speed is attained.

4. A variable speed planetary transmission mechanism comprising a sun gear, an internal gear surrounding the same, an intermediate planetary gear, a planetary gear carrier, an overrunning or one-way clutch for preventing reverse rotation of said planetary gear carrier, a drum connected with said internal gear wheel surrounding said planetary gear carrier, a multiple disk friction clutch between said drum and planetary gear carrier, a lever mounted within said drum having a T-head fulcrumed thereon and bearing against said friction clutch, the shank of said lever extending longitudinally of said drum and having a weighted outer end whereby centrifugal force will apply pressure to said clutch, a pin passing radially through an aperture in said weighted lever with its outer end engaging said drum and a spring latch between said pin and weighted lever for restraining the centrifugal operation of the latter until said drum has attained a predetermined angular speed.

HORACE T. THOMAS.